US012614416B2

(12) United States Patent　　(10) Patent No.: US 12,614,416 B2
Girstmair et al.　　(45) Date of Patent: Apr. 28, 2026

(54) METHOD AND APPARATUS FOR DIAGNOSING AND MONITORING VEHICLES, VEHICLE COMPONENTS AND ROUTES

(71) Applicant: Siemens Mobility Austria GmbH, Vienna (AT)

(72) Inventors: Bernhard Lukas Girstmair, Graz (AT); Gerald Grabner, Graz (AT); Andreas Haigermoser, Oberhaag (AT); Justinian Rosca, Princeton, NJ (US); Daniela Dejaco, Graz (AT); Johannes Simon, Graz (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 997 days.

(21) Appl. No.: 17/054,866

(22) PCT Filed: May 15, 2019

(86) PCT No.: PCT/EP2019/062498
§ 371 (c)(1),
(2) Date: Nov. 12, 2020

(87) PCT Pub. No.: WO2019/219756
PCT Pub. Date: Nov. 21, 2019

(65) Prior Publication Data
US 2021/0217256 A1　　Jul. 15, 2021

(30) Foreign Application Priority Data

May 16, 2018　(AT) ............................... A50407/2018

(51) Int. Cl.
*G07C 5/08*　　(2006.01)
*B61L 15/00*　　(2006.01)
(Continued)

(52) U.S. Cl.
CPC ........ *G07C 5/0808* (2013.01); *B61L 15/0081* (2013.01); *B61L 27/53* (2022.01);
(Continued)

(58) Field of Classification Search
CPC ...... B61L 15/0081; B61L 27/53; B61L 27/57; G06N 20/10; G07C 5/0808; G07C 5/008
See application file for complete search history.

(56) References Cited

U.S. PATENT DOCUMENTS 6,332,354 B1　12/2001　Lalor et al.
8,533,222 B2 *　9/2013　Breckenridge ........ G06N 20/00
707/777

(Continued)

FOREIGN PATENT DOCUMENTS

CN　　103229148　　7/2013
CN　　103745229　　4/2014
(Continued)

OTHER PUBLICATIONS

Office Action dated Nov. 3, 2021 issued in Russian Patent Application No. 2020141186/11.
(Continued)

*Primary Examiner* — Fadey S. Jabr
*Assistant Examiner* — Michael J Herrera
(74) *Attorney, Agent, or Firm* — Cozen O'Connor

(57) ABSTRACT

A method and apparatus for diagnosing and monitoring vehicles, vehicle components, routes and route components, wherein at least one first sensor is used to perform measurements and at least one computing unit is used to effect signal processing, where the at least one computing unit is supplied with at least measured first signals, at least one first characteristic value is formed from the at least first signals, the at least one first characteristic value or at least one first characteristic value combination is classified via at least one
(Continued)

first statistical model, or a prediction is performed, and where at least one technical first condition indicator for at least one first vehicle component or at least one route component is determined, such that safe detection of faults, damage, excess wear, etc., and effective, condition-oriented maintenance of vehicles and infrastructures are achieved.

28 Claims, 2 Drawing Sheets

(51) Int. Cl.

| | | |
|---|---|---|
| *B61L 27/53* | (2022.01) | |
| *B61L 27/57* | (2022.01) | |
| *G06N 20/10* | (2019.01) | |
| *G07C 5/00* | (2006.01) | |

(52) U.S. Cl.
CPC .............. *B61L 27/57* (2022.01); *G06N 20/10* (2019.01); *G07C 5/008* (2013.01)

(56) References Cited

U.S. PATENT DOCUMENTS

| | | | |
|---|---|---|---|
| 8,849,732 B2 | 9/2014 | Raileanu et al. | |
| 8,874,304 B2* | 10/2014 | Friesen ................. | G01M 17/10 |
| | | | 701/29.2 |
| 10,417,076 B2* | 9/2019 | Ciasulli .................... | G06N 7/01 |
| 10,652,257 B1* | 5/2020 | Shah ................... | G06F 11/3452 |
| 11,067,592 B2* | 7/2021 | Hurst ...................... | G01P 21/02 |
| 11,132,615 B2* | 9/2021 | Natarajan .............. | G06N 20/00 |
| 11,604,461 B2* | 3/2023 | Ottewill ................... | G06N 3/08 |
| 2012/0136629 A1* | 5/2012 | Tamaki .............. | G05B 23/0254 |
| | | | 702/183 |
| 2013/0024179 A1* | 1/2013 | Mazzaro ................. | F01D 17/20 |
| | | | 703/18 |
| 2013/0325762 A1 | 12/2013 | Raileanu et al. | |
| 2014/0129060 A1* | 5/2014 | Cooper .................. | G07C 5/008 |
| | | | 701/19 |
| 2014/0200827 A1 | 7/2014 | Bhattacharjya et al. | |
| 2014/0200830 A1* | 7/2014 | Bhattacharjya ....... | B61L 23/045 |
| | | | 702/34 |
| 2016/0155315 A1* | 6/2016 | McElhinney ......... | G06F 11/008 |
| | | | 340/502 |
| 2016/0358106 A1* | 12/2016 | Anderson .............. | G06N 20/00 |
| 2017/0061783 A1* | 3/2017 | Nalukurthy .......... | G08B 29/186 |
| 2017/0178426 A1 | 6/2017 | Ezawa | |
| 2017/0286572 A1* | 10/2017 | Hershey .................... | B64F 5/60 |
| 2017/0322116 A1* | 11/2017 | Escobedo Hernandez .................. | |
| | | | F02D 41/1401 |
| 2018/0046926 A1* | 2/2018 | Achin .................... | G06F 9/5011 |
| 2018/0053401 A1* | 2/2018 | Martin ................... | H04M 11/04 |
| 2018/0208221 A1* | 7/2018 | Singh .................. | B61L 15/0081 |
| 2018/0339720 A1* | 11/2018 | Singh ...................... | G06T 7/001 |
| 2019/0287683 A1* | 9/2019 | Srinivasan ............. | G06N 20/00 |
| 2020/0219010 A1* | 7/2020 | Jobling ................. | G06F 16/285 |
| 2021/0019878 A1* | 1/2021 | Iizawa ................... | G06V 20/00 |

FOREIGN PATENT DOCUMENTS

| | | |
|---|---|---|
| CN | 106976468 | 7/2017 |
| DE | 10163148 | 10/2002 |
| JP | 2005-067276 | 3/2005 |
| JP | 2016-002777 | 1/2016 |
| WO | WO 99/06809 | 2/1999 |
| WO | 2012047529 | 4/2012 |
| WO | 2019012730 | 1/2019 |
| WO | 2019016996 | 1/2019 |

OTHER PUBLICATIONS

PCT International Search Report and Written Opinion of International Searching Authority mailed Aug. 16, 2019 corresponding to PCT International Application No. PCT/EP2019/062498 filed May 15, 2019.

* cited by examiner

METHOD AND APPARATUS FOR DIAGNOSING AND MONITORING VEHICLES, VEHICLE COMPONENTS AND ROUTES

CROSS-REFERENCE TO RELATED APPLICATIONS

This is a U.S. national stage of application No. PCT/EP2019/062498 filed 15 May 2019. Priority is claimed on Austrian Application No. A50407/2018 filed 16 May 2018, the content of which is incorporated herein by reference in its entirety.

BACKGROUND OF THE INVENTION

1. Field of the Invention

The invention relates to a method for diagnosing and monitoring vehicles, vehicle components, routes and route components, in particular for rail vehicles and infrastructures of rail vehicles, where at least one first sensor is used to perform measurements and at least one computing unit is used to perform signal processing.

2. Description of the Related Art

Vehicles, in particular rail vehicles, need to have a high level of operational safety. An accurate assessment and prediction of technical states of vehicles, bogies, routes and further vehicle and infrastructure components is therefore important. Effective and efficient servicing and maintenance of vehicles and infrastructures is additionally significant.

DE 101 63 148 A1 discloses a monitoring and diagnosing method for a rail vehicle, where operating parameters of the rail vehicle are captured and the operating parameters are supplied to a monitoring hierarchy to characterize an operational behaviour of the rail vehicle. The conventional approach, in its known form, has the disadvantage that although measurement signals are evaluated via statistical methods, no assessments or forecasts of evaluation results are evident using statistical methods.

SUMMARY OF THE INVENTION

In view of the foregoing, it is therefore an object of the invention to provide a particularly reliable method that has been developed further as compared with the prior art.

This and other objects and advantages are achieved in accordance with the invention by a method in which at least measured first signals are supplied to the at least one computing unit, in which at least one first characteristic value is formed from the at least first signals, in which the at least first characteristic value or at least one first characteristic value combination is classified via at least one first statistical model or a prediction is made based on the at least first characteristic value or the at least first characteristic value combination, and in which at least one technical first state indicator for at least one first vehicle component or at least one route component is determined from at least one classification result or from at least one prediction result.

This achieves particularly reliable detection of damage and effective, state-oriented servicing and maintenance of vehicles and infrastructures, where a tolerable or negligible number of false alarms can be assumed.

This is achieved by virtue of the method according to the invention involving a classification or a prediction of characteristic values or combinations of different characteristic values being performed via statistical models. This means that, e.g., faulty or faultless states or a faulty or faultless behaviour of a vehicle component (e.g., of a shock absorber) or of a route component (e.g., of a track) no longer need or needs to be detected based on rigid limit values, but rather that, for example, limit values or limit value characteristics, are adaptable based on operating conditions of a vehicle or of an infrastructure, of a breakdown behaviour of a vehicle or infrastructure component, or the like. State indicators in this instance can be determined, e.g., from frequency distributions for classification results or for prediction results.

In an advantageous embodiment, the at least first statistical model is formed via a machine learning method.

This measure achieves an ongoing reliability improvement or increase for the method in accordance with the invention with respect to detecting and assessing technical states as the volume of captured operating data increases, because the first statistical model is trained on the basis of the operating data, and therefore fault states can be distinguished from faultless states ever better as time passes.

It is advantageous if the at least first statistical model is formed on the basis of an equalization calculation.

Various statistical models are therefore available, in connection with the method in accordance with the invention, for classifying and/or predicting characteristic values, where the models can be combined with one another. It is thus possible, for example, not only to detect instantaneous fault states but also to estimate fault states via interpolation or extrapolation, to predict when operating limit dimensions are reached, etc.

In an advantageous embodiment, the at least first state indicator is assigned a first probability value for an occurrence of a technical state that can be indicated by the at least one classification result or the at least one prediction result.

This measure further reduces risks with respect to false alarms, because detection of fault states can be performed not only on the basis of limit values or limit value characteristics but also based on probabilities of infringements of these limit values or of these limit value characteristics, etc.

These probabilities can be formed, e.g., based on frequencies of the cited infringements.

It is additionally advantageous if one to n3 state indicators having one to n4 probability values are formed from signals from one to n1 signal categories and one to n2 characteristic values ascertained therefrom, where each of the one to n3 state indicators is assigned one of the one to n4 probability values and a combination state indicator having an assigned combination probability value is formed from the one to n4 probability values.

The combination state indicator, in this instance, can be formed via a probabilistic graphical model, for example.

The use of more than one state indicator allows technical states to be assessed with better quality. If, for example, the first state indicator or a first state indication having a high first probability value indicates a fault in the first vehicle component and if a second state indicator or a second state indication having a low second probability value indicates a fault in a second vehicle component, then the first state indication can be plausibilized and backed up via the second state indication (and vice versa).

In an advantageous embodiment, data from at least one method step are used in an onboard diagnosis and/or monitoring device of a vehicle. By way of example, it is possible for characteristic values or state indicators to be used.

A further evaluation and/or a formation of warning events, status or fault outputs, etc., can be effected in the onboard diagnosis and/or monitoring device. These can be output in a driver's cab of the vehicle, for example, as visual and/or audible warnings and/or status information or monitoring and/or diagnosis information.

It is also advantageous, however, if data from at least one method step are transmitted to an infrastructure-based device.

This measure allows characteristic values, state indicators, etc. to be evaluated on land (e.g., on a servicing platform), where data from entire vehicle fleets can be combined and compared with one another.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of exemplary embodiments, in which:

FIG. 2: shows a result graph with classification results determined via a support vector machine method for an illustrative embodiment of the method in accordance with the invention; and FIG. 3: shows a rail vehicle with sensors, a computing unit and a data transmission device for performing the method in accordance with the invention.

DETAILED DESCRIPTION OF THE EXEMPLARY EMBODIMENTS

Figure 1:
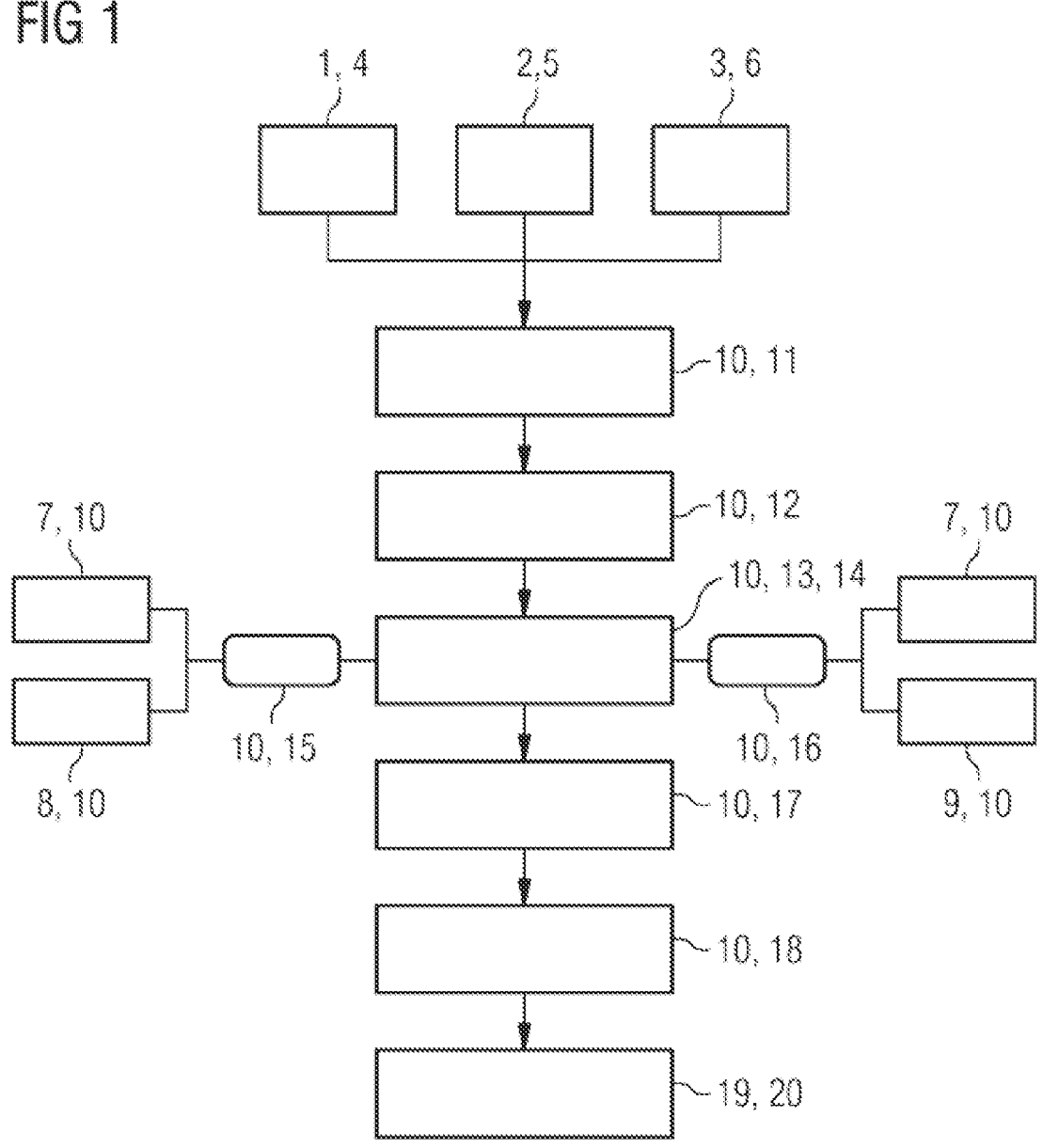
FIG. 1: shows a flowchart for an illustrative embodiment of a method in accordance with the invention.
Figures 2, 3:
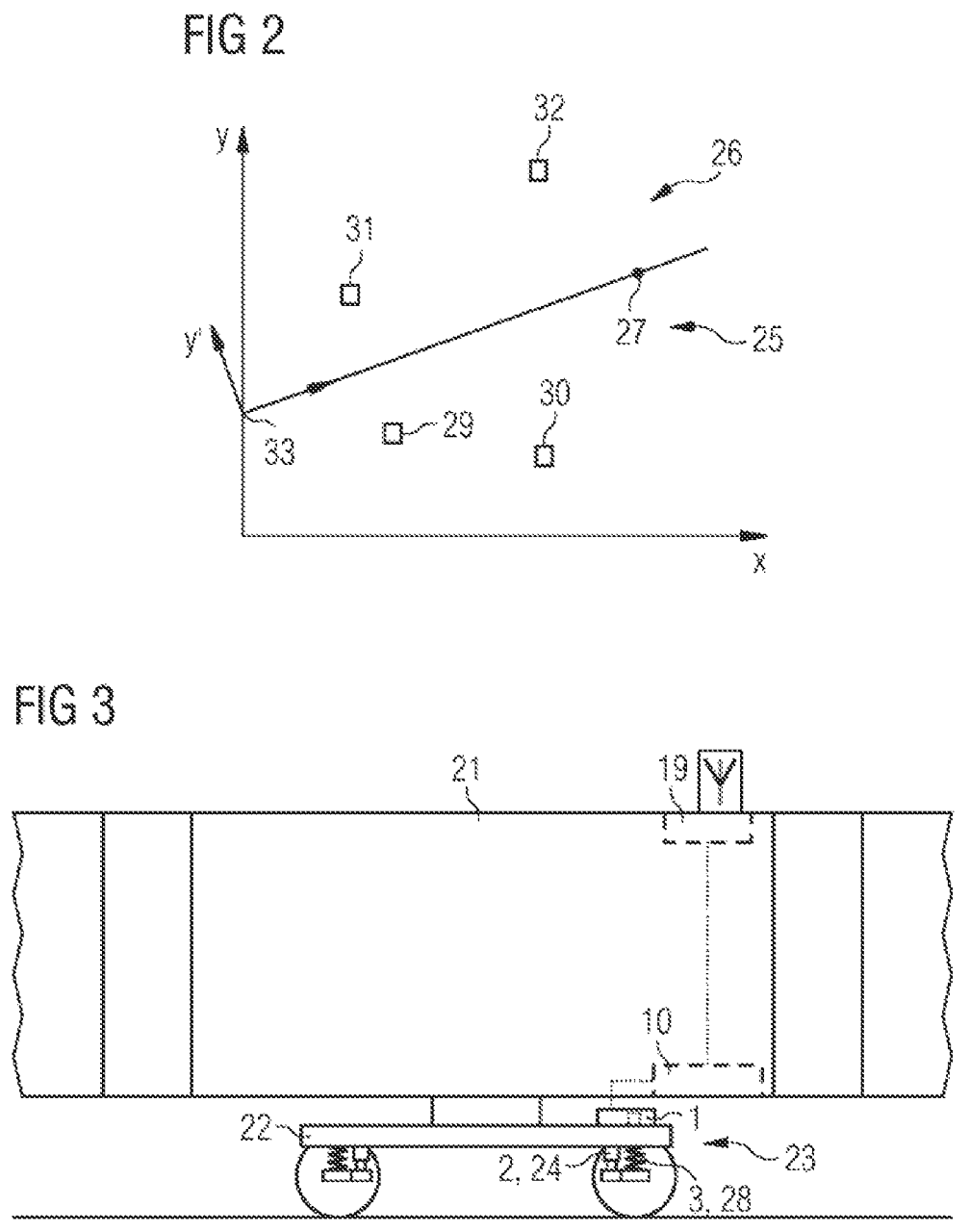

An illustrative variant embodiment, depicted schematically in FIG. 1, of a partly computer-implemented method in accordance with the invention is implemented in a computing unit 10 arranged in a coach body 21 of a rail vehicle depicted in FIG. 3.

On a bogie frame 22 of a bogie 23 of the rail vehicle there is provision for a first sensor 1 that measures accelerations of the bogie frame 22, i.e., is formed as an acceleration sensor. Furthermore, a second sensor 2 formed as a temperature sensor is connected to a shock absorber 24 of the bogie 23 and a third sensor 3 in the form of a strain gauge is arranged on a spring 28 of the bogie 23.

The second sensor 2 measures shock absorber temperatures, while the third sensor 3 measures deformations in the spring 28.

The first sensor 1, the second sensor 2 and the third sensor 3 continually take measurements.

The first sensor 1, the second sensor 2, the third sensor 3 and the computing unit 10 are supplied with electricity via a power supply device, which is not depicted. Continual signal processing 11 and evaluation of continually captured first signals 4 from the second sensor 1, second signals 5 from the second sensor 2 and third signals 6 from the third sensor 3 is effected in the computing unit 10, which is connected to the first sensor 1, the second sensor 2 and the third sensor 3.

Furthermore, evaluation processes of the computing unit 10 include already pre-processed reference signals, i.e., first reference signals recorded and processed chronologically before the first signals 4, second reference signals recorded and processed chronologically before the second signals 5 and third reference signals recorded and processed chronologically before the third signals 6.

The signal processing 11 comprises storage of the first signals 4, the second signals 5 and the third signals 6 and preparation thereof for the evaluation processes.

The first signals 4 and the first reference signals are acceleration signals for the bogie frame 22, the second signals 5 and the second reference signals are temperature signals for the shock absorber 24, and the third signals 6 and the third reference signals are deformation signals for the spring 28.

First characteristic values are formed from the first signals 4, second characteristic values are formed from the second signals 5 and third characteristic values are formed from the third signals 6 (characteristic value determination 12). Chronologically before the first characteristic values, the second characteristic values and the third characteristic values, first reference characteristic values 7 are formed from the first reference signals, second reference characteristic values 8 are formed from the second reference signals and third reference characteristic values 9 are formed from the third reference signals. The first characteristic values, the second characteristic values, the third characteristic values, the first reference characteristic values 7, the second reference characteristic values 8 and the third reference characteristic values 9 are statistical characteristic values, in this illustrative embodiment of a method in accordance with the invention mean values from acceleration, shock absorber temperature and spring deformation characteristics. In accordance with the invention, however, it is also possible for the statistical characteristic values formed to be minima, maxima, etc.

The statistical characteristic values relate to defined route sections or to time periods assignable to the route sections via a relationship with a speed of travel of the rail vehicle. The characteristic values are associated with the reference characteristic values via these route sections or time periods, i.e., the first characteristic values are referenced to the same route sections and time periods as the first reference characteristic values 7, the second characteristic values are referenced to the same route sections and time periods as the second reference characteristic values 8 and the third characteristic values are referenced to the same route sections and time periods as the third reference characteristic values 9.

The first characteristic values, the second characteristic values and the third characteristic values are inserted into a first statistical model 15, a second statistical model 16 and into further statistical models implemented in the computing unit 10 and are continually classified and predicted via these statistical models (classification 13 and prediction 14).

The first statistical model 15 and the second statistical model 16 are formed via a machine learning method, what is known as the support vector machine.

The method of the support vector machine is known from the prior art and is used for this illustrative embodiment of a method in accordance with the invention in a linear binary variant in order to classify characteristic values or characteristic value combinations.

The first statistical model 15 is formed or trained from the first reference characteristic values 7 and the second reference characteristic values 8, and the second statistical model 16 is formed or trained from the first reference characteristic values 7 and the third reference characteristic values 9. The first reference characteristic values 7, the second reference characteristic values 8 and the third reference characteristic values 9 thus act as learning data for the first statistical model 15 and the second statistical model 16.

From a past observation of the shock absorber 24, for example, it is known that if the bogie frame 22 has an acceleration in a defined first acceleration range for a relatively long time, i.e., with an observed frequency, and the shock absorber 24 has a temperature within a defined first temperature range for a relatively long time, i.e., with an observed frequency, then the shock absorber 24 is in a faultless state. Furthermore, it is known from the past observation of the shock absorber 24 that if the bogie frame 22 has an acceleration in a defined second acceleration range for a relatively long time, i.e., with an observed frequency, and the shock absorber 24 has a temperature within a defined second temperature range for a relatively long time, i.e., with an observed frequency, then the shock absorber 24 is damaged or in a defective or faulty state.

The acceleration ranges and the temperature ranges indicating a faulty or faultless state of the shock absorber 24 can change on the basis of the operating behaviour of the rail vehicle. A fundamental aspect is that the shock absorber 24 is observed and acceleration ranges and temperature ranges are associated with faulty or faultless states of the shock absorber 24.

The first statistical model 15 is formed based on characteristic value combinations or reference characteristic value combinations, i.e., locally and temporally correlated pairs of first reference characteristic values 7 and second reference characteristic values 8 indicate favorable or unfavorable states of the shock absorber 24 depending on whether the pairs are in the first acceleration range or in the second acceleration range or in the first temperature range or in the second temperature range.

Reference characteristic value combinations that indicate a favorable shock absorber state (i.e., pairs of first reference characteristic values 7 and second reference characteristic values 8 that are in the first acceleration range and the first temperature range) define a first state range 25 that is below a separating straight line 27; reference characteristic value combinations that indicate an unfavorable shock absorber state (i.e., pairs of first reference characteristic values 7 and second reference characteristic values 8 that are in the second acceleration range and the second temperature range) define a second state range 26 that is above the separating straight line 27. The first state range 25, the second state range 26 and the separating straight line 27, which are depicted in FIG. 2 in graphical form, are localizable via vectors.

The separating straight line 27 is formed from the reference value combinations in a manner such that normal distances from the separating straight line 27 to the reference characteristic value combinations of the first state range are 25 mathematically negative normal and distances from the separating straight line 27 to the reference characteristic value combinations of second range are the state 26 mathematically positive. An applicable formation rule for the separating straight line 27 is known from the prior art and is described, for example, in Ethem A., Introduction to Machine Learning, Third Edition, The MIT Press Cambridge, Massachusetts, London, England, 2014.

In this illustrative embodiment of a method in accordance with the invention, statistical models are trained only on the basis of one reference characteristic value category (e.g., based on the second reference characteristic values 8 and their behaviour as a function of time or the like), i.e., for no reference characteristic value combinations to be used. This allows shock absorber states to be assessed even if, e.g., sensor defects mean that only one reference characteristic value category is available.

The second statistical model 16 is formed using the scheme described above that is also used to form the first statistical model 15. To form the second statistical model 16, however, accelerations and acceleration ranges of the bogie frame 22 are used in combination with deformations and deformation ranges of the springs 28.

The first statistical model 15 and the second statistical model 16 are used to perform the classification 13 of characteristic values.

First characteristic value combinations formed from the first characteristic values and the second characteristic values are assigned to the first state range 25 or to the second state range 26 of the first statistical model 15 based on their position with respect to the separating straight line 27.

Second characteristic value combinations formed from the first characteristic values and the third characteristic values are assigned to applicable state ranges of the second statistical model 16 using the same scheme.

In this illustrative embodiment of a method in accordance with the invention, the classification 13 is performed not only based on characteristic value combinations but also on the basis of individual characteristic values (e.g., the second characteristic values and their behaviour as a function of time). This is accomplished, for example, by using the second characteristic values in the statistical model formed via the second reference characteristic values 8 without the use of reference characteristic value combinations.

Further statistical models based on an equalization calculation are used to effect the prediction 14 based on characteristic values. For this purpose, conventional linear regression functions are provided and are implemented in the computing unit 10. These regression functions are formed from the first characteristic values, the second characteristic values and the third characteristic values via conventional formation rules and are used to perform interpolations or extrapolations based on the characteristic values.

By way of example, regressions of the second characteristic values and the first characteristic value combinations are performed based on the speed of travel in order to be able to form a functional between relationship the second characteristic values and the first characteristic value combinations, on the one hand, and the speed of travel, on the other hand. This allows, for example, the determination of maximum speeds of travel up to which the shock absorber 24 can be operated without excessive wear, etc., occurring prematurely.

Frequency distributions for classification results and prediction results are therefore used to continually determine state indicators (indicator determination 17). Classification results in this illustrative embodiment of a method in accordance with the invention are associations of characteristic values or characteristic value combinations with state ranges of statistical models.

Prediction results are, e.g., forecasts of average shock absorber temperatures based on the speed of travel.

A first state indicator is formed as a result of a number of first characteristic value combinations assigned to the second state range 26 being referenced, i.e., related, to a total number of first characteristic value combinations. This is used to form a first probability value that provides evidence of the likelihood that a shock absorber defect exists. The first state indicator thus contains a piece of information "shock absorber defective" with an associated probability of this shock absorber defect.

Using the same scheme, a second state indicator relating to a spring defect with an associated second probability value is formed for the second characteristic value combination.

Further state indicators are formed, using the same scheme, from the second characteristic values and the association thereof with state ranges in statistical models formed via the second reference characteristic values 8 without the use of reference characteristic value combinations.

State indicators from prediction results are formed by virtue of an extrapolated average shock absorber temperature being assigned a confidence probability determined based on a frequency of occurrence of extrapolated average shock absorber temperatures situated in a defined tolerance range. State indicators from prediction results therefore indicate, inter alia, forecasts about a state of the shock absorber 24 (e.g., a forecast according to which a high level of wear on the shock absorber 24 during operation above a specific speed of travel, and a reduction in the life of the shock absorber 24, can be expected) or of another component with an associated confidence probability.

Furthermore, a continual indicator combination 18 is performed such that one to n3=2 state indicators (first state indicator, second state indicator) having one to n4=2 probability values (first probability value, second probability value) are formed (see above) from signals from one to n1=3 signal categories (first signals 4, second signals 5, third signals 6) and one to n2=3 characteristic values ascertained therefrom (first characteristic values, second characteristic values, third characteristic values; n2 is greater than or equal to n1), where each of the one to n3=2 state indicators is assigned one of the one to n4=2 probability values (see above) and a combination state indicator having an assigned combination probability value $P_K$ is formed from the one to n4=2 probability values. In this regard, each of the one to n4=2 probability values is formed from a frequency of a specific classification result referenced to a total number of classification results (see above), and the combination probability value $P_K$ is formed as a conditional probability from the one to n4=2 probability values.

The combination probability value $P_K$ is formed via a probabilistic graphical model on a machine learning method.

In this regard, the following formation rule is applied in principle:

$$P_K = \frac{P_{DF} \cdot P_F}{P_D}$$

The combination probability value $P_K$ is ascertained from a first parameter $P_{DF}$, which indicates a probability of a fault in the shock absorber 24 being indicated by the first state indicator and the second state indicator when the shock absorber 24 is actually in a faulty state, from a second parameter $P_F$, which indicates a probability of the shock absorber 24 actually being in a faulty state, and from a third parameter $P_D$, which indicates a probability of a fault being indicated by the first state indicator and the second state indicator.

The combination probability value $P_K$ describes a probability of the shock absorber 24 actually being in a faulty state under a condition according to which a fault is indicated by the first state indicator and the second state indicator.

If the first state indicator referenced directly to the shock absorber 24 has a high probability of indicating a fault, for example, and if the second state indicator referenced to the spring 28 has a low probability of indicating a fault, then the combination state indicator will have a high probability of indicating a fault in the shock absorber 24.

The first parameter $P_{DF}$, the second parameter $P_F$ and the third parameter $P_D$ are continually adapted via operational observations. By way of example, the second parameter $P_F$ is increased if an increased frequency of a shock absorber defect is observed over a defined period. These operational observations are used to form learning data for a functional relationship of the second parameter $P_F$ over a time, where the functional relationship is used to parameterize an increase in a probability of failure of the shock absorber 24 as the period of use increases and to train the probabilistic graphical model.

In this illustrative exemplary embodiment of a method in accordance with the invention, the first state indicator is referenced to a first vehicle component (the shock absorber 24) and the second state indicator is referenced to a second vehicle component (the spring 28). In accordance with the invention, however, it is also conceivable for, e.g., both the first state indicator and the second state indicator to relate to the first vehicle component. This is realized, for example, by virtue of two different sensors being provided on or in the shock absorber 24 which produce different signals (e.g., temperature signals and oil pressure signals, etc.).

In this illustrative exemplary embodiment of a method in accordance with the invention, a third state indicator is also formed on the basis of the first characteristic values and the speed of travel, where the third state indicator indicates faulty and faultless states of a track, i.e., a route or a route component.

A statistical model that has state ranges for faulty and faultless track states is formed, using the scheme explained above, with reference characteristic value combinations of accelerations of the bogie frame 22 and speeds of travel, from observations of a track damage behaviour via a support vector machine method.

Characteristic value combinations of continually measured accelerations of the bogie frame 22 and measured speeds of travel are assigned to the state ranges, which results in a classification 13 of the characteristic value combinations. The third state indicator is determined from a frequency distribution for corresponding classification results.

Data formed in the method step of the indicator combination 18 (data from the first state indicator, the second state indicator and the third state indicator) are used in a diagnosis and monitoring device implemented in the computing unit 10 continually and are evaluated further there. Furthermore, these data are also continually transmitted to a servicing platform, i.e., to an infrastructure-based device, via a data transmission device 19 (shown in FIG. 3) of the rail vehicle (data transmission 20) for further evaluation.

FIG. 2 shows a graph with a first state range 25, a second state range 26 and a separating straight line 27 for a first statistical model 15, which are also described in connection with FIG. 1, are formed based on a support vector machine method and via which technical states of a shock absorber 24 shown in FIG. 3 are assessable.

Accelerations are plotted on an x axis of the graph; shock absorber temperatures are plotted on a y axis.

The first state range 25 has an assigned first function value 29 and an assigned second function value 30 for first characteristic value combinations described in connection with FIG. 1.

The second state range 26 has an assigned third function value 31 and an assigned fourth function value 32 for first characteristic value combinations.

The first function value 29, the second function value 30, the third function value 31 and the fourth function value 32 are formed from first characteristic value combinations. The first characteristic value combinations are in turn formed from first characteristic values for accelerations of a bogie frame 22 shown in FIG. 3 and from second characteristic values for temperatures of the shock absorber 24.

Referring to a Cartesian coordinate system 33, the first function value 29 and the second function value 30 have negative y' coordinates and the third function value 31 and the fourth function value 32 have positive y' coordinates. The first function value 29 and the second function value 30 are associated with a favorable shock absorber state, the third function value 31 and the fourth function value 32 are associated with an unfavorable state of the shock absorber 24.

As described in connection with FIG. 1, a first state indicator indicating a shock absorber defect when applicable is formed from an accumulation of unfavorable shock absorber states (e.g., in the event of such states occurring more than three times a day).

Using the scheme shown in FIG. 2, function values formed from second characteristic value combinations are also assigned to applicable state ranges of a second statistical model 16 described in connection with FIG. 1. The second characteristic value combinations, as mentioned in connection with FIG. 1, are formed from the first characteristic values and from third characteristic values for a deformation of a spring 28 shown in FIG. 3. As described in connection with FIG. 1, a second state indicator indicating a spring defect when applicable is formed from an accumulation of unfavorable spring states based on an association of acceleration/spring deformation function values with state ranges (e.g., in the event of such spring states occurring more than three times a day).

In accordance with the disclosed embodiments of the invention, the second characteristic values are assigned to state ranges of a further statistical model based on a support vector machine method. This further statistical model is formed using time characteristics of second reference characteristic values 8, described in connection with FIG. 1, as a temperature/time relationship.

Second characteristic values that, as time passes, show increasing temperatures that are above a temperature/time separating straight line formed specifically for this further statistical model over a defined period indicate a shock absorber defect or excessive shock absorber wear.

FIG. 3 depicts a rail vehicle having a coach body 21 and a bogie 23. The bogie 23 has a shock absorber 24, which is a primary shock absorber, and a spring 28, which is formed as a primary spring, the technical states of which are ascertained and assessed via a method in accordance with the invention as described in connection with FIG. 1.

A first sensor 1 is provided on a bogie frame 22 of the bogie 23 for measuring accelerations of the bogie frame 22, i.e., an acceleration sensor. Furthermore, a second sensor 2, which is in the form of a temperature sensor, is connected to the shock absorber 24.

In addition, the spring 28 has a third sensor 3, which is formed as a strain gauge.

The first sensor 1, the second sensor 2 and the third sensor 3 are connected to a computing unit 10 in the coach body 21 so as to conduct signals and power.

In a roof area of the rail vehicle, there is provision for a data transmission device 19, which is formed as a radio device and connected to the computing unit 10 so as to conduct signals and power.

The data transmission device 19 also has a locating apparatus formed as a global positioning system unit.

The computing unit 10 is supplied with power via an onboard electrical system (not shown) of the rail vehicle and, for its part, supplies the first sensor 1, the second sensor 2, the third sensor 3 and the data transmission device 19 with electricity.

The computing unit 10 has a computer program product installed in it via which method steps of the method in accordance with the invention as shown in FIG. 1, i.e., signal processing 11, characteristic value determination 12, classification 13, prediction 14, indicator determination 17 and indicator combination 18, are continually performed.

State indicators determined in the computing unit 10, which functions as a diagnosis and monitoring device of the rail vehicle, are used to form warning events that are transmitted via a train bus (not shown) of the rail vehicle to a display unit in a driver's cab (likewise not shown) of the rail vehicle and are output there as warnings or status information (e.g., to indicate a shock absorber defect or a remaining life of the shock absorber 24).

Furthermore, the state indicators are transmitted by radio via the data transmission device 19 to an infrastructure-based device which, in connection with this illustrative embodiment of an apparatus in accordance with the invention, is a servicing platform, for further evaluation about a vehicle fleet.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for diagnosing and monitoring vehicles, vehicle components, routes and route components via an apparatus including at least one first sensor arranged on a bogie of the vehicle, at least one second sensor, at least one third sensor, and including at least one computer provided within the vehicle and connected to the at least one first, second and third sensors, the at least one computer including a plurality of statistical models, the at least one first sensor performing measurements during operation of the vehicle, and the at least one computer performing signal processing during operation of the vehicle, the method comprising:

operating the vehicle and supplying at least measured first, second and third signals to the at least one computer;

forming, by the at least one computer during operation of the vehicle, at least one first, at least one second and at least one third characteristic value from the at least measured first, second and third signals, the at least one first, at least one second and at least one third characteristic value being inserted into the plurality of statistical models, a first statistical model of the plurality of statistical models being trained from first and second reference characteristic values and a second statistical model of the plurality of statistical models being trained from first and third reference characteristic values;

classifying, continuously by the at least one computer during operation of the vehicle, the at least one first, at least one second and at least one third characteristic value or at least one combination of the at least one first characteristic value via a prediction based on one of the at least one first, at least one second and at least one third characteristic value and the combination of the at least one first, at least one second and at least one third characteristic value;

determining, by the at least one computer during operation of the vehicle, one of (i) at least one technical first state indicator for at least one first vehicle component and (ii) at least one route component from one of at least one classification result and at least one prediction result during operation of the vehicle to reduce risks associated with false alarms;

transmitting data including the at least one technical first state indicator from at least one of said forming, classifying and determining to an infrastructure-based device comprising a service platform and evaluating the transmitted data including the at least one technical first state indicator at the infrastructure-based device; and performing state-oriented servicing or maintenance of vehicles or infrastructure at the service platform based on the at least one technical first state indicator.

2. The method as claimed in claim 1, wherein the at least one technical first state indicator is determined from a frequency distribution for one of classification results and prediction results.

3. The method as claimed in claim 2, wherein the at least one first characteristic value is formed as a statistical characteristic value referenced to one of a route section and a time period.

4. The method as claimed in claim 1, wherein the at least one first characteristic value is formed as a statistical characteristic value referenced to one of a route section and a time period.

5. The method as claimed in claim 1, wherein the at least one first statistical model is formed via a machine learning method.

6. The method as claimed in claim 5, wherein the at least one first characteristic value or the at least one first characteristic value combination is classified via a support vector machine method.

7. The method as claimed in claim 6, wherein reference characteristic values are formed as learning data from reference signals processed chronologically before the at least measured first signals.

8. The method as claimed in claim 5, wherein reference characteristic values are formed as learning data from reference signals processed chronologically before the at least measured first signals.

9. The method as claimed in claim 1, wherein the at least one first statistical model is formed based on an equalization calculation.

10. The method as claimed in claim 9, wherein the at least one first characteristic value is inserted into a regression function.

11. The method as claimed in claim 1, wherein the at least one first state indicator is assigned a first probability value for an occurrence of a technical state which is indicated by at least one of (i) the at least one classification result and (ii) the at least one prediction result.

12. The method according to claim 11, wherein the first probability value is formed from a frequency of a specific classification result referenced to a total number of classification results.

13. The method as claimed in claim 1, wherein one to n3 state indicators having one to n4 probability values are formed from signals from one to n1 signal categories and one to n2 characteristic values ascertained therefrom; and wherein each of the one to n3 state indicators is assigned one of the one to n4 probability values and a combination state indicator having an assigned combination probability value is formed from the one to n4 probability values.

14. The method as claimed in claim 13, wherein each of the one to n4 probability values is formed from a frequency of a specific classification result referenced to a total number of classification results.

15. The method as claimed in claim 14, wherein the combination probability value $(P_K)$ is formed as a conditional probability from the one to n4 probability values.

16. The method as claimed in claim 14, wherein the combination state indicator is formed via a probabilistic graphical model.

17. The method as claimed in claim 13, wherein the combination probability value is formed as a conditional probability from the one to n4 probability values.

18. The method as claimed in claim 17, wherein the combination state indicator is formed via a probabilistic graphical model.

19. The method as claimed in claim 13, wherein the combination state indicator is formed via a probabilistic graphical model.

20. The method as claimed in claim 19, wherein the probabilistic graphical model is formed based on a machine learning method.

21. The method as claimed in claim 1, wherein at least one second characteristic value and a technical second state indicator for the at least one first vehicle component are formed from second signals.

22. The method as claimed in claim 1, wherein at least one second characteristic value and a technical second state indicator for a second vehicle component are formed from second signals.

23. The method as claimed in claim 1, wherein data from at least one method step are utilized in an on-board diagnoser and/or monitor of a vehicle.

24. The method as claimed in claim 1, wherein said monitoring and diagnosing of the vehicles, vehicle components, routes and route components are performed for rail vehicles and infrastructures of rail vehicles.

25. An apparatus comprising:
   at least one first sensor arranged on a bogie of a vehicle;
   at least one second sensor;

at least one third sensor; and at least one computer provided within the vehicle and connected to the at least one first, second and third sensors, the at least one computer including a plurality of statistical models;

wherein the at least one computer is configured to:

receive at least measured first, second and third signals during operation of the vehicle;

form, during operation of the vehicle, at least one first, at least one second and at least one third character-istic value from the at least measured first, second and third signals, the at least one first, at least one second and at least one third characteristic value being inserted into the plurality of statistical models, a first statistical model of the plurality of statistical models being trained from first and second reference characteristic values and a second statistical model of the plurality of statistical models being trained from first and third reference characteristic values;

classify, continuously during operation of the vehicle, the at least one first, at least one second and at least one third characteristic value or at least one combi-nation of the at least one first, at least one second and at least one third characteristic value via a prediction based on one of the at least one first, at least one second and at least one third characteristic value and the combination of the at least one first, at least one second, and at least one third characteristic value; and determine one of (i) at least one technical first state indicator for at least one first vehicle component and (ii) at least one route component from one of at least one classification result and at least one prediction result during operation of the vehicle to reduce risks associated with false alarms;

wherein data including the at least one technical first state indicator from at least one of said formation, classification and determination is transmitted to an infrastructure-based device comprising a service platform and the transmitted data including the at least one technical first state indicator is evaluated at the infrastructure-based device; and wherein the at least one technical first state indicator is utilized for state-oriented servicing or maintenance of vehicles or infrastructure at the service platform.

26. The apparatus as claimed in claim 25, wherein the at least one computer is provided in a coach body of the vehicle.

27. The apparatus as claimed in claim 26, further com-prising:

at least one data transmitter provided within or on the vehicle and connected to the at least one computer for providing data transmission.

28. The apparatus as claimed in claim 25, further com-prising:

at least one data transmitter provided within or on the vehicle and connected to the at least one computer for providing data transmission.

* * * * *